(12) United States Patent
Takashima

(10) Patent No.: US 8,582,160 B2
(45) Date of Patent: Nov. 12, 2013

(54) PRINTING SYSTEM, CONTROL METHOD THEREOF, AND STORAGE MEDIUM

(75) Inventor: Keiichi Takashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 12/954,394

(22) Filed: Nov. 24, 2010

(65) Prior Publication Data

US 2011/0134476 A1 Jun. 9, 2011

(30) Foreign Application Priority Data

Dec. 7, 2009 (JP) ................................. 2009-278013

(51) Int. Cl.
*G06F 15/00* (2006.01)

(52) U.S. Cl.
USPC .......................... 358/1.15; 358/1.13; 358/1.14

(58) Field of Classification Search
None
See application file for complete search history.

(56) References Cited

U.S. PATENT DOCUMENTS

| | | | |
|---|---|---|---|
| 6,474,881 B1 | 11/2002 | Wanda | |
| 7,145,683 B2 * | 12/2006 | Tuchitoi et al. | 358/1.15 |
| 2006/0001908 A1 * | 1/2006 | Ohta | 358/1.15 |
| 2006/0023247 A1 * | 2/2006 | Yamakawa | 358/1.14 |
| 2007/0019233 A1 * | 1/2007 | Rai et al. | 358/1.15 |
| 2007/0201091 A1 * | 8/2007 | Tanaka | 358/1.16 |
| 2007/0229879 A1 * | 10/2007 | Harmon et al. | 358/1.15 |
| 2008/0151293 A1 * | 6/2008 | Narukawa | 358/1.15 |
| 2008/0239382 A1 * | 10/2008 | Matsueda | 358/1.15 |
| 2009/0037473 A1 * | 2/2009 | Hiraguchi | 707/104.1 |
| 2009/0257078 A1 * | 10/2009 | Sawada et al. | 358/1.14 |
| 2010/0033761 A1 * | 2/2010 | Nakagiri et al. | 358/1.15 |
| 2010/0141983 A1 * | 6/2010 | Sorrentino et al. | 358/1.15 |

FOREIGN PATENT DOCUMENTS

JP 2001-75768 A 3/2001

\* cited by examiner

*Primary Examiner* — Twyler Haskins
*Assistant Examiner* — Helen Q Zong
(74) *Attorney, Agent, or Firm* — Carter, DeLuca, Farrell & Schmidt LLP

(57) ABSTRACT

A printing system includes a host computer and a printer. The host computer includes a CPU that requests to the printer a storing job list of storing jobs and determines a plurality of jobs to be collectively printed and a printing order of the plurality of jobs from the received storing job list. The CPU then creates a job list based on the determination and transmits the job list to the printer. The printer includes a CPU that stores the storing jobs, acquires the storing job list according to the request, and transmits the storing job list to the host computer. The printer further includes a printing unit that prints the storing jobs corresponding to the job list.

9 Claims, 12 Drawing Sheets

FIG.8

```
COLLECTIVE JOB LIST
{
  NUMBER OF JOBS
  COLLECTIVE JOB INFORMATION
  {
    JOB NAME;
    BOX NO.;
  }
  ··· × NUMBER OF JOBS
}
```

FIG.9

```
JOB LIST
{
  NUMBER OF JOBS:
  JOB INFORMATION:
  {
    JOB NAME;
    BOX NO.;
    REUSE FLAG;
  }
  ··· × NUMBER OF JOBS
}
```

PRINTING SYSTEM, CONTROL METHOD THEREOF, AND STORAGE MEDIUM

BACKGROUND OF THE INVENTION

1. Field of the Invention

The present invention relates to a printing system that can continuously print a plurality of jobs in an order designated by a user, a control method thereof and a storage medium.

2. Description of the Related Art

Variable data printing (VDP) is used in printing a print product such as direct mail by combining print data common to each page with variable data which changes for each page. In performing VDP, a plurality of types of paper may be used in one print product, or finishing may be switched a plurality of times. Further, different applications appropriate for each of page contents are often used in VDP, such as drawing software for printing a cover page, word processing software for printing a body text, and a spreadsheet application for printing a statement.

There is a method for outputting such a print product on one printing apparatus. More specifically, a print product is divided into a plurality of jobs according to the application that can handle a print setting or a content of the page. The plurality of jobs is then printed from the same personal computer (PC) in the desired order of output, and the series of outputs are collected into one print product. However, if the printing apparatus prints data corresponding to one page after printing the data corresponding to a large number of pages, the printing apparatus may output the print job of the data corresponding to one page first. Further, if the printing apparatus is connected to a network, a job from another PC may become mixed into the series of jobs.

To solve such problems, there is a method for combining all print jobs into one job after spooling the print jobs in a host side and then transmitting to the printing apparatus (i.e., job combination method). Further, there is a method for spooling all print jobs on the host side and then transmitting the printing jobs to the printing apparatus in the order designated by the user (i.e., collective printing) (e.g., Japanese Patent Application Laid-Open No. 2001-75768).

On the other hand, recent multifunction peripherals include an execution environment of the application software. Examples of the execution environment are MEAP (registered trademark) by Canon Inc., Embedded Software Architecture (ESA) (registered trademark) by Ricoh Corporation, and ApeosPort (registered trademark) by Xerox Corporation. By executing the software on the multifunction peripheral, it becomes easier to customize functions or add functions that are originally not included in the apparatus, without reconfiguring the apparatus itself.

However, if only one print setting can be specified to each of the plurality of jobs combined in the job combination method, a printing result of one of the jobs may be changed. Further, in the case of the collective printing method, a job from another PC may become mixed when the printing apparatus connected via the network receives the jobs. Thus, it is necessary to limit the PC that transmits the job to the printing apparatus to one PC.

Furthermore, in the case of both the job combination method and the collective printing method, the data is transmitted to the printing apparatus after all of the jobs are received on the host side. A long time thus elapses from receiving an output start instruction from the user to outputting the result. Moreover, since fixed pages are also printed each time from the host, efficiency does not become improved.

SUMMARY OF THE INVENTION

According to an aspect of the present invention, a printing system includes an information processing apparatus and a printing apparatus. The information processing apparatus includes a job list request unit configured to request to the printing apparatus a storing job list of jobs that are stored in the printing apparatus, a determination unit configured to determine a plurality of jobs to be collectively printed and a printing order of the plurality of jobs from the storing job list received from the printing apparatus, a job list creation unit configured to create a job list based on the plurality of jobs to be collectively printed and the printing order of the plurality of jobs determined by the determination unit, and a first job list transmission unit configured to transmit the job list created by the job list creation unit to the printing apparatus. The printing apparatus includes a storing unit configured to store a storing job received from the information processing apparatus, a second job list transmission unit configured to acquire the storing job list of the jobs stored in the storing unit and transmit the storing job list to the information processing apparatus according to a request from the job list request unit, and a printing unit configured to print the storing jobs corresponding to the job list in an order according to the job list received from the information processing apparatus.

The printing system according to the present invention assures a printing order of a plurality of jobs with different print settings and is capable of efficiently performing printing for a user.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates a structure of a collective job list.

FIG. 9 illustrates a structure of a job list.

DESCRIPTION OF THE EMBODIMENTS

Various exemplary embodiments, features, and aspects of the invention will be described in detail below with reference to the drawings.

Figure 1:
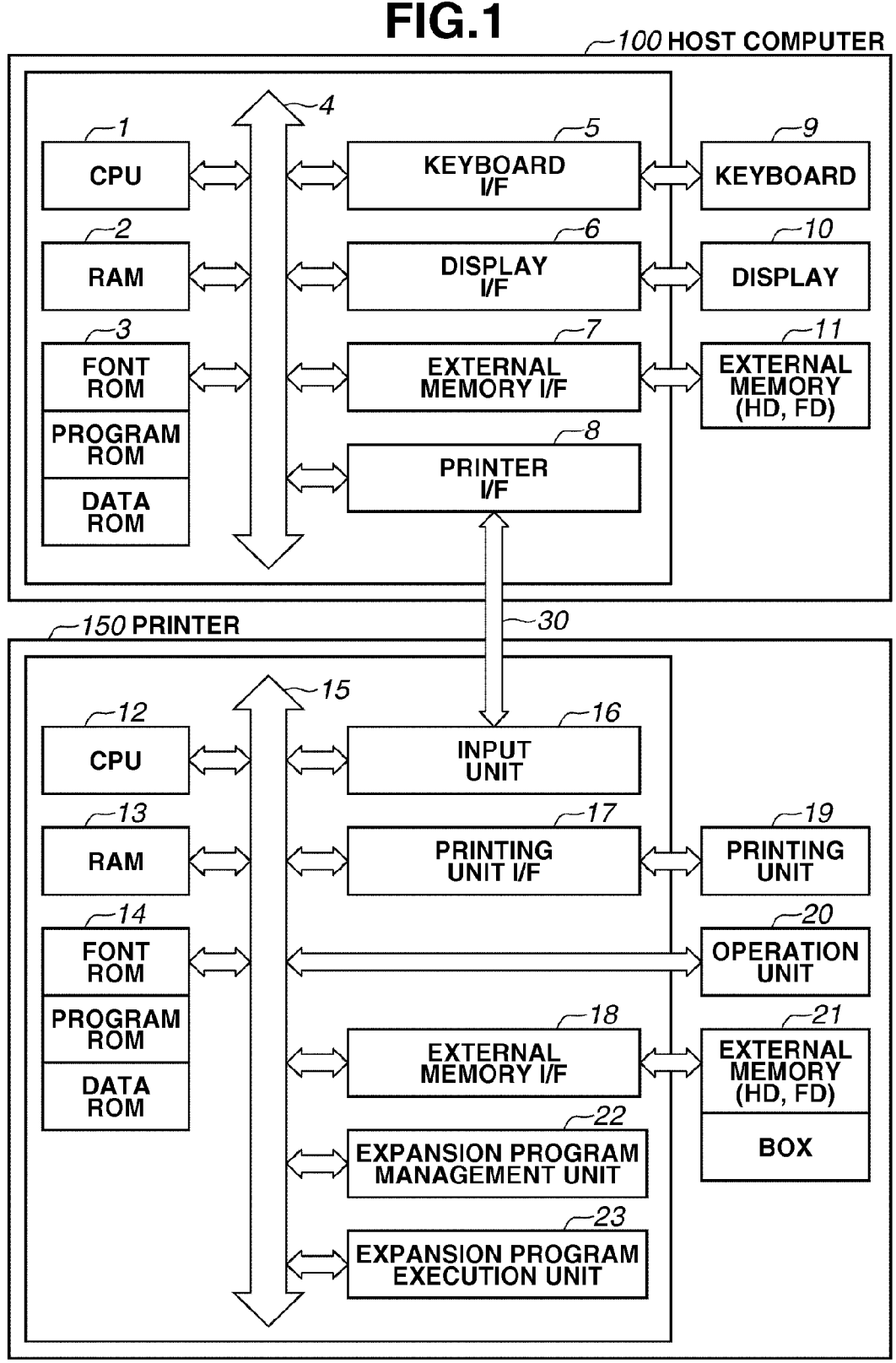
FIG. 1 is a block diagram illustrating a printing system according to an exemplary embodiment of the present invention.

FIG. 1 s a block diagram illustrating a configuration of a printing system including an information processing apparatus and a printing apparatus according to an exemplary embodiment of the present invention. An example of the printing system according to the present exemplary embodiment employs Windows (registered trademark) by Microsoft Corporation as an operating system (OS). Unless otherwise stated, the present invention is applicable regardless of the configuration of a device as long as the functions of the present invention can be executed. The system may be configured of a single device or a plurality of devices, or may perform processes by connecting via a network such as a local area network (LAN) or a wide area network (WAN).

Referring to FIG. 1, a host computer 100 is the information processing apparatus in the printing system according to the present exemplary embodiment. The host computer 100 includes a central processing unit (CPU) 1. The CPU 1 processes a document in which diagrams, images, text, and tables (including spreadsheets) are mixed, based on a document processing program stored in a program read-only memory (ROM) in a ROM 3 or an external memory 11.

Further, the CPU 1 collectively controls each device connected to a system bus 4. The program ROM in the ROM 3 or the external memory 11 also stores the OS, i.e., the control program of the CPU 1. As described above, according to the present exemplary embodiment, the printing system employs Windows (registered trademark) by Microsoft Corporation as the OS. A font ROM of the ROM 3 or the external memory 11 stores font data and the like to be used in performing document processing. A data ROM of the ROM 3 or the external memory 11 stores various types of data to be used in performing document processing.

A random access memory (RAM) 2 functions as a main memory and a work area of the CPU 1. A keyboard interface (I/F) 5 controls key input by a user via a keyboard 9 or a pointing device (not illustrated). A display I/F 6 controls displaying on a display 10. An external memory I/F 7 controls access to the external memory 11 such as a hard disk (HD) and a flexible disk (FD). The external memory 11 stores a boot program, various applications, font data, a user file, an edit file, a printer driver, and so on.

A printer I/F 8 is connected to a printer 150 via a predetermined bi-directional interface 30 and controls communication between the printer 150. For example, the CPU 1 rasterizes an outline font to a display information RAM set on the RAM 2 and allows "what you see is what you get (WYSIWYG)" on the display 10. Further, the CPU 1 opens various windows that are registered based on a command instructed by the user using a mouse cursor (not illustrated) on the display 10 and performs various types of data processing.

When the user prints information created using an application, the user opens on the display 10 a user interface for setting the information. The user then specifies the settings on the printer 150 and selects a printing mode. In such a case, the user can specify the settings for performing various print processing methods via the user interface provided by the printer driver.

The printer 150 is the printing apparatus in the printing system according to the present exemplary embodiment. The printer 150 includes a CPU 12 that outputs an image signal as output information to a printing unit 19 via a printing unit I/F 17 connected to a system bus 15. The CPU 12 outputs the image signal based on a control program stored in the program ROM in a ROM 14 or an external memory 21. The program ROM in the ROM 14 stores the control program of the CPU 12 and the like. A font ROM in the ROM 14 stores the font data used in generating the output information.

The CPU 12 can bi-directionally communicate with the host computer 100 via an input unit 16 and can notify the host computer 100 of information inside the printer 150. The information which can be notified from the printer 150 to the host computer 100 include a printer engine status, network setting information, a device name, a resource name, and so on.

A RAM 13 functions as the main memory and the work area of the CPU 12, and a memory capacity of the RAM 13 can be expanded by an option RAM connected to an expanded port (not illustrated). The RAM 13 is used as an output information rasterization area, an environmental data storage area, and a non-volatile RAM (NVRAM). An external memory I/F 18 controls access to the external memory 21 such as the hard disk (HD) or an integrated chip (IC) card.

The external memory 21 which is connected as an option stores the font data and an emulation program. The external memory 21 also includes an area for a BOX function. The BOX function is a function in which the printer 150 stores in the external memory 21 a storing job transmitted from the host computer 100 thereto, and then, the printer 150 prints the storing job according to an instruction from an operation unit 20 or the control program. According to the present exemplary embodiment, a job which is stored by the BOX function in the external memory 21 of the printer 150 without being printed will be referred to as a storing job.

The number of external memories 21 in the printer 150 is not limited to one. The printer 150 may include at least one or more external memory 21 and be connectable to a plurality of external memories which store option font cards and programs that can interpret a different printer control language in addition to an internal font. Further, it is not necessary for the printer 150 to include the external memory 21. If no external memory 21 is connected to the printer 150, the data to be stored in the external memory is stored in the ROM 14. Further, the printer 150 may include a NVRAM (not illustrated) that stores printer mode setting information received from the operation unit 20. Switches and light-emitting diode (LED) indicators are disposed in the operation unit 20.

An expansion program management unit 22 installs and uninstalls the expansion program to and from the external memory 21 and performs license management of the expansion program. The expansion program is application software developed by the user or provided by an independent software vendor (ISV). The expansion program is used to customize the functions originally included in the printer 150 or to add a new function to the printer 150. An expansion program execution unit 23 loads the expansion program stored in the external memory 21 on the RAM 13 via the external memory I/F 18 and executes the program.

Figure 2:
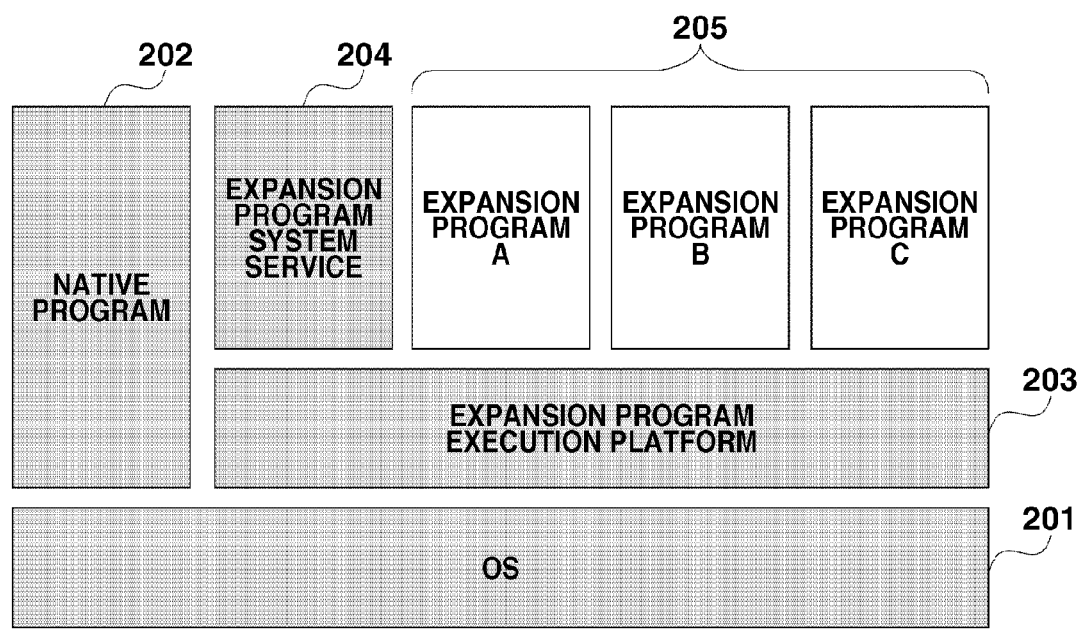
FIG. 2 is a block diagram illustrating an execution environment of an expansion program in the printing apparatus.

FIG. 2 is a block diagram illustrating an execution environment of the expansion programs. A native program 202 originally included in the printer, a facsimile, or a scanner, and an expansion program execution platform 203 which is an application execution platform are running on a printer OS 201.

Further, an expansion program system service 204 and expansion programs 205 are running on the expansion program execution platform 203 (i.e., the application execution platform).

The expansion program system service 204 is a utility library that is commonly useful to the expansion programs and is provided from the system. The function of the expansion program system service 204 can be called up from the expansion program 205, so that it becomes unnecessary to develop the expansion program.

The expansion program 205 can access and communicate with another expansion program 205 and each block in the printer 150 such as the RAM 13 only via the expansion program execution platform 203 or the expansion program system service 204.

Figure 3:
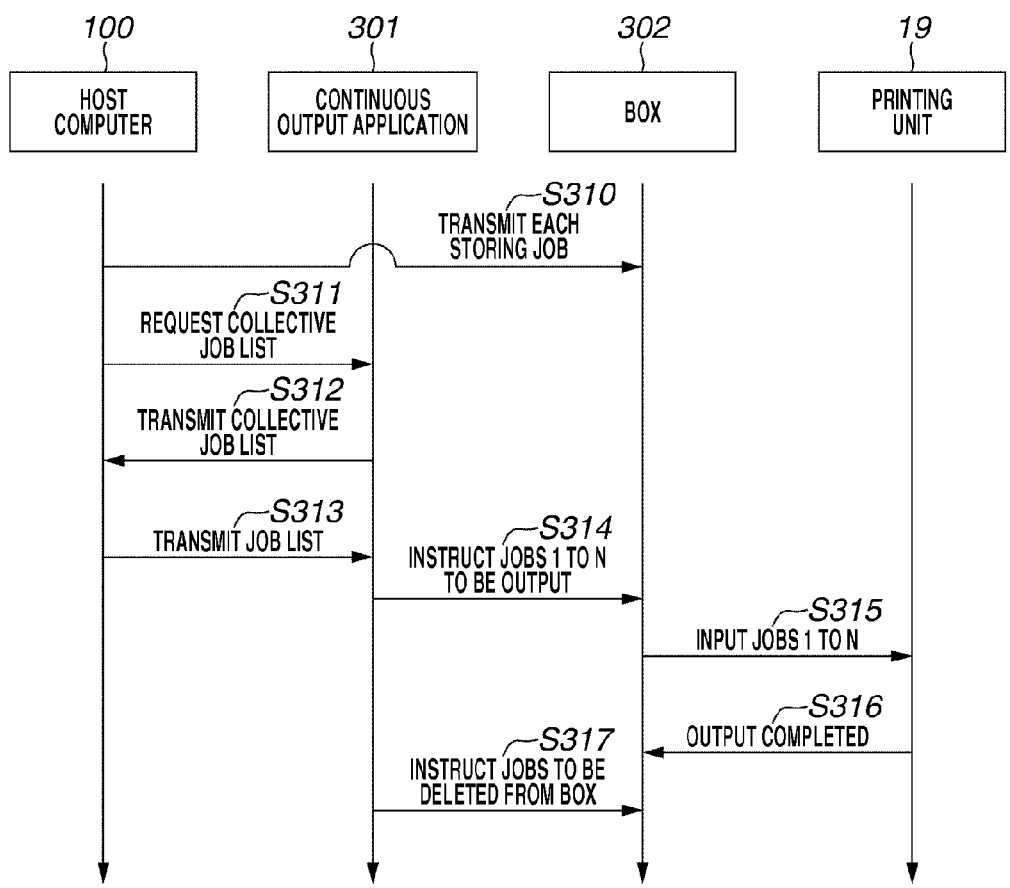
FIG. 3 is an entire sequence diagram illustrating a process for assuring a multiple job printing order.

FIG. 3 is an entire sequence diagram illustrating a process for assuring a multiple job printing order in the printing system illustrated in FIG. 1.

In step S310, the host computer 100 transmits to the printer 150 a plurality of jobs that the user desires to continuously output. The printer 150 then stores the received plurality of jobs in the external memory 21. A BOX 302 is a control program that manages the storing jobs. When transmitting the jobs to the printer 150, the user uses the application software to read the documents to be continuously output, and opens a print setting screen of the printer driver.

Figure 4:
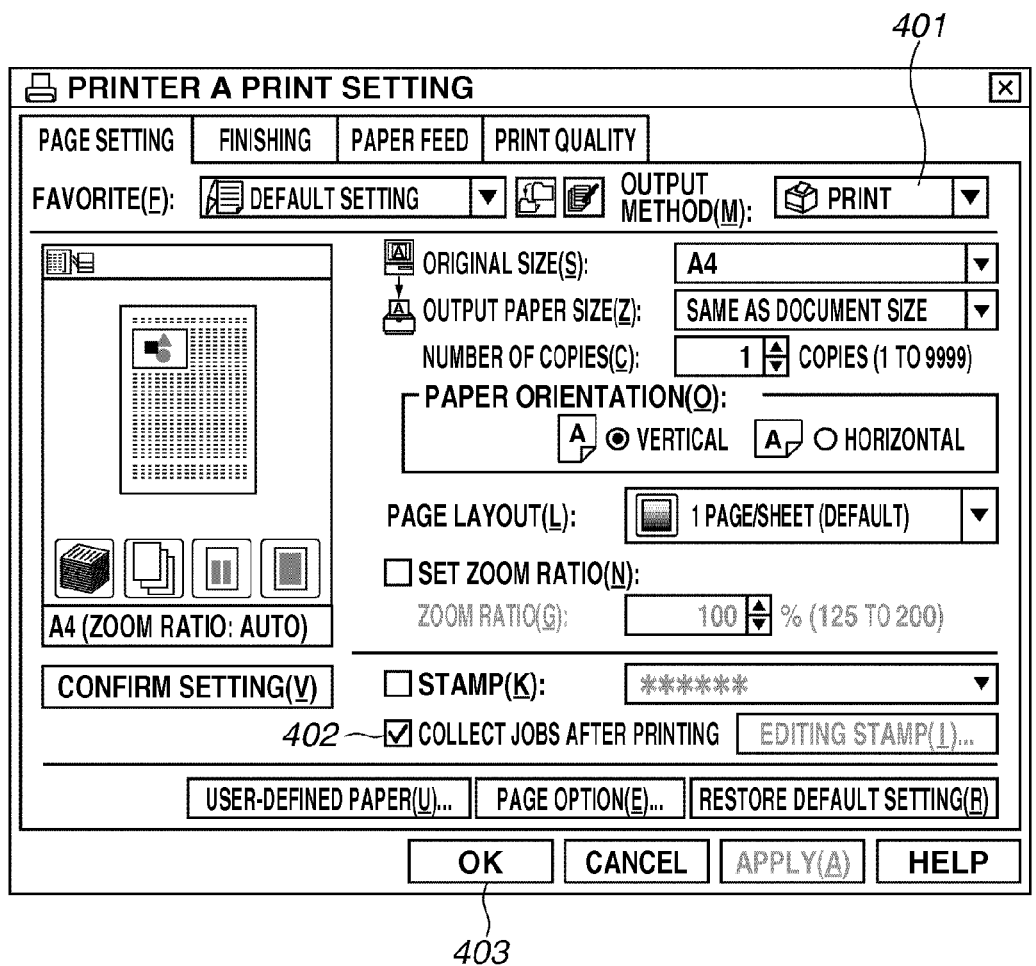
FIG. 4 illustrates an example of a print setting screen of a printer driver.

FIG. 4 is an example of the print setting screen of the printer driver that is displayed on the display 10. Referring to FIG. 4, an output method 401 is changed to "save" by a user operation on the print setting screen. After the user checks a check box 402 and presses an OK button 403, the print setting for assuring the multiple job printing order is specified.

The user then performs a print execution operation on the application software, and the BOX 302 performs control so that the storing job whose collective print attribute among the print attributes is set "ON" is output and stored in the BOX area of the external memory 21. The user performs the above described process for each of the plurality of jobs that the user desires to continuously output. The user may separately output the storing jobs from a plurality of host computers 100 to the printer 150. Further, a plurality of users may each output the storing jobs separately.

Figure 5:
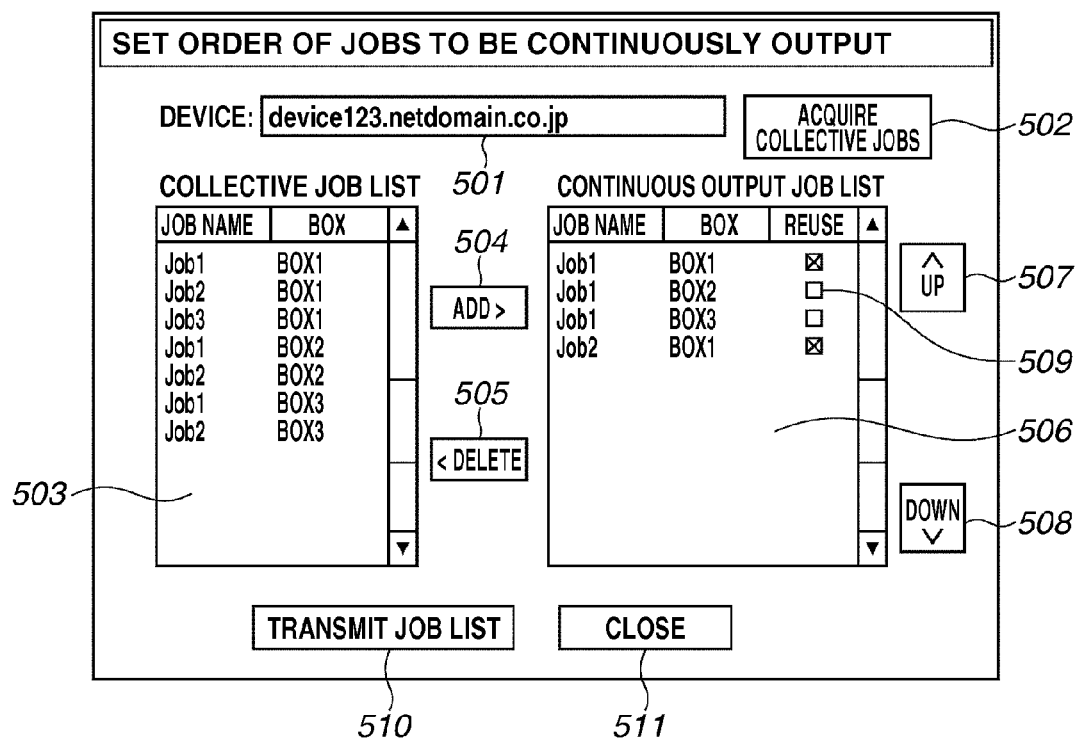
FIG. 5 illustrates an example of a screen for setting an order of jobs to be continuously output.

In step S311 to step S313 illustrated in FIG. 3, the host computer 100 transmits to the printer 150 a job list which designates the order of continuous output. FIG. 5 illustrates an example of a screen of a job list transmission program that is used for setting the order of the storing jobs to be continuously output and instructing transmission of the job list.

Figure 6:
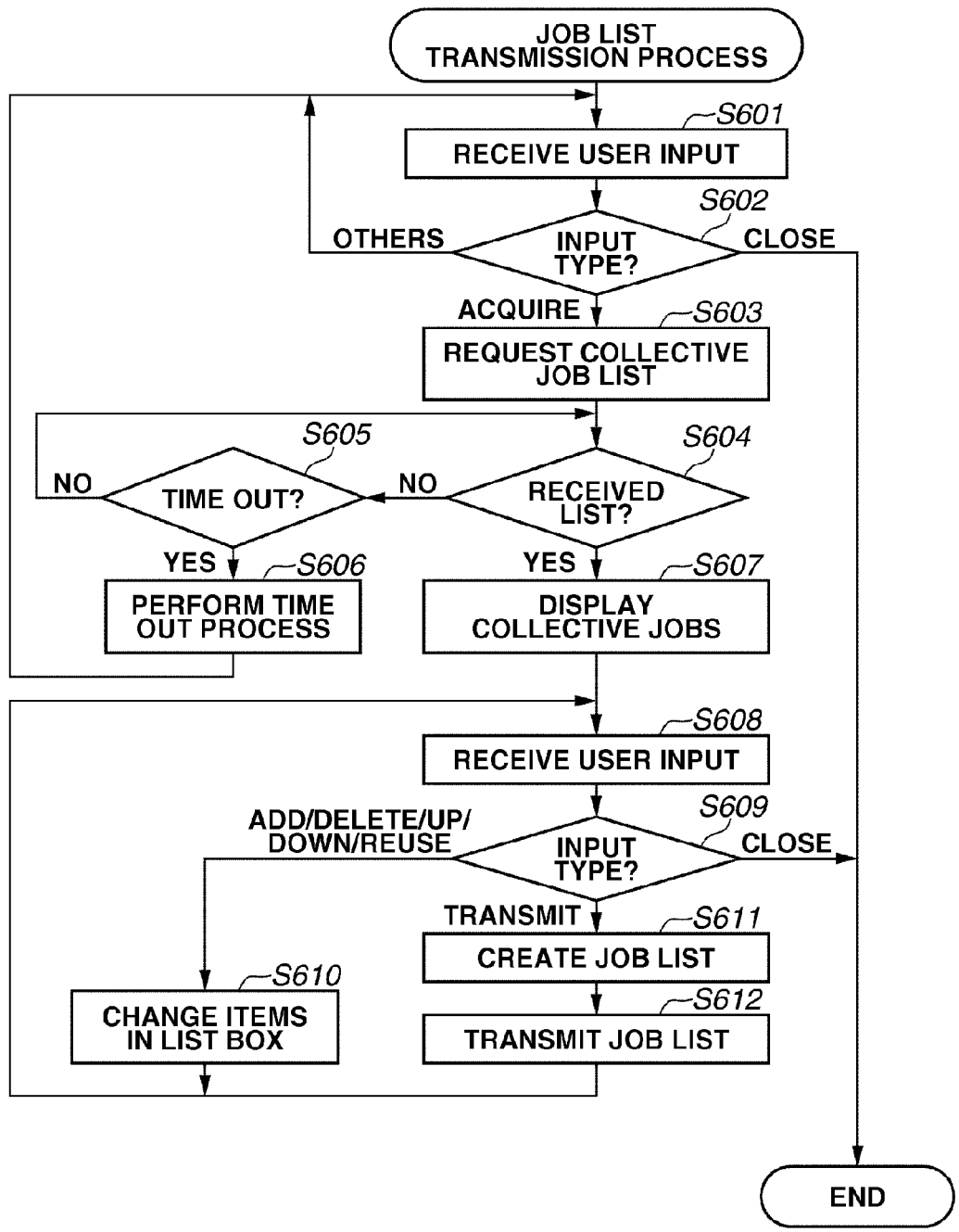
FIG. 6 is a flowchart illustrating a job list transmission process.

An operation of the job list transmission program will be described in detail below with reference to a flowchart illustrated in FIG. 6. The process of the flowchart illustrated in FIG. 6 is executed by the CPU 1 in the host computer 100 controlling each component of the host computer 100 according to the program stored in the ROM 3.

In step S601, the CPU 1 receives a user input from the keyboard 9. In step S602, the CPU 1 determines a type of the user input received in step S601. If the CPU 1 determines that the input type is "acquire" (ACQUIRE in step S602), the process proceeds to step S603. If the CPU 1 determines that the input type is "close" (CLOSE in step S602), the process ends. If the CPU 1 determines that the input type is "others" (OTHERS in step S602), the process returns to step S601.

More specifically, the user inputs to a device name input box 501 in the screen illustrated in FIG. 5 a network name or a network address which uniquely identifies the printer 150 that stores the storing job. The user then presses a collective job acquisition button 502. In such a case, the CPU 1 determines that the input type is "acquire". Further, if the user presses a close button 511, the CPU 1 determines that the input type is "close". Furthermore, if the user performs an operation other than the above described operations, the CPU 1 determines that the input type is "others".

In step S603, the CPU 1 transmits a collective job list request to the printer 150 indicated by the content input to the device name input box 501. The continuous output application 301 illustrated in FIG. 3 in the printer 150 which receives the collective job list request from the host computer 100 creates the collective job list and transmits the list to the host computer 100.

Figure 7:
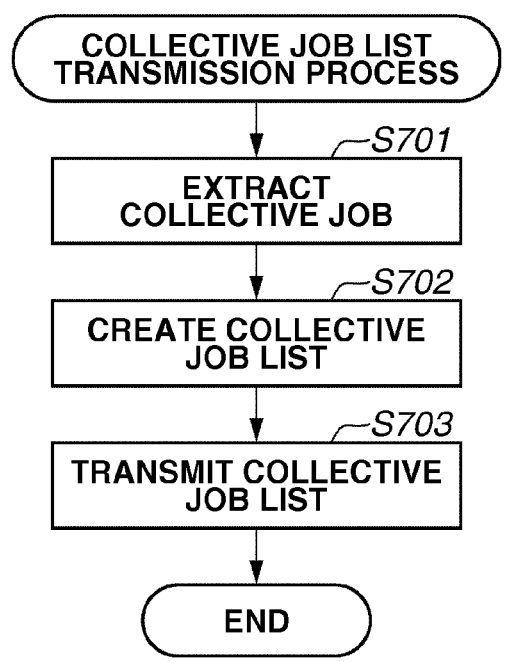
FIG. 7 is a flowchart illustrating a collective job list transmission process.

A job list transmission process performed by the printer 150 will be described below with reference to FIG. 7. FIG. 7 is a flowchart illustrating in detail the collective job list transmission process. In step S701, the CPU 12 extracts from the storing jobs stored in the external memory 21 of the printer 150 the storing job whose collective print attribute is set "ON". In step S702, the CPU 12 creates the collective job list. In step S703, the CPU 12 transmits the created collective job list to the requesting host computer 100.

FIG. 8 illustrates a structure of the collective job list. The collective job list is configured of a number of jobs and pieces of collective job information corresponding to the number of jobs. An order of the pieces of the collective job information is not relevant. The collective job information is configured of a job name that uniquely identifies the job in the BOX, and a BOX number. Such a structure allows the user to uniquely identify the job in the BOX whose collective job attribute is set "ON".

In step S604 of the flowchart illustrated in FIG. 6, the CPU 1 determines whether the collective job list is received from the printer 150. If the CPU 1 determines that the collective job list is received (YES in step S604), the process proceeds to step S607. If the CPU 1 determines that the collective job list is not received (NO in step S604), the process proceeds to step S605.

In step S605, the CPU 1 determines whether a predetermined time has elapsed from the process performed in step S603 and that a time out has been reached. If the time out has been reached (YES in step S605), the process proceeds to step S606. If the time out has not been reached (NO in step S605), the process returns to step S604, and the CPU 1 waits for the collective job list to be transmitted from the printer 150.

In step S606, the CPU 1 performs time-out processing. The process then returns to step S601, and the CPU 1 again receives the user input.

In step S607, the CPU 1 displays on a list box 503 in the screen illustrated in FIG. 5 the collective job list received from the printer 150. In step S608, the CPU 1 receives the user input from the keyboard 9.

In step S609, the CPU 1 determines the type of input received from the user in step S608. If the input type is one of "add", "delete", "up", "down", or "reuse" (ADD/DELETE/UP/DOWN/REUSE in step S608), the process proceeds to step S610. On the other hand, if the input type is "close" (CLOSE in step S608), the process ends. If the input type is "transmit" (TRANSMIT in step S608), the process proceeds to step S611.

More specifically, when the user presses an add button 504, a delete button 505, an up button 507, or a down button 508 in the screen illustrated in FIG. 5, the CPU 1 determines that the input type is "add", "delete", "up", or "down" respectively. Further, if the user checks a reuse check box 509, the CPU 1 determines the input type as "reuse". Furthermore, if the user presses the close button 511, the CPU 1 determines the input type as "close". Moreover, if the user presses a job list transmission button 510, the CPU 1 determines the input type as "transmit".

In step S610, the CPU 1 changes items in a list box according to the user input received in step S608. More specifically, if the user presses the add button 504, the item that is currently selected in the list box 503 is added to the list box 506. The same item in the list box 503 can be added to the list box 506 a plurality of times. If the user presses the delete button 505, the item that is currently selected in the list box 506 is deleted from the list box 506.

If the user presses the up button 507, the order of the item that is currently selected in the list box 506 becomes higher. On the other hand, if the user presses the down button 508, the order of the item that is currently selected in the list box 506 becomes lower.

Further, a setting of the reuse attribute of the item in the list box 506 is switched between "ON" and "OFF" (i.e., a reuse designation) by the user checking the check box 509 for each item. If the reuse attribute is set "ON", the job is not deleted even after continuous printing is performed and can be reused in a different print product. The reuse process will be described below.

In step S611, the CPU 1 creates in the work area of the RAM 13 the job list in which the content set in the list box 506 is reflected (i.e., a job list creation step).

FIG. 9 illustrates a structure of the job list created in step S611. Referring to FIG. 9, the job list indicates the order of the jobs to be continuously output and includes the number of jobs and pieces of the job information for the number of jobs. The job information indicates the jobs which have been selected from the collective job list using the add button 504 by aligning according to the order in the list box 506, and includes the collective job information to which a reuse flag is added. The plurality of jobs among the storing jobs to be collectively printed and the printing order thereof are determined by the jobs and the order of jobs in the list box 506.

In step S612, the CPU 1 transmits the created job list to the printer 150 indicated by the network name or the network address input to the device name input box 501. The processes described above correspond to the processes performed from step S311 to step S313 in the sequence diagram illustrated in FIG. 3.

In step S314 to step S317 illustrated in FIG. 3, after the host computer 100 transmits the job list to the printer 150, the continuous output application 301 of the printer 150 receives the job list. The continuous output application 301 then continuously outputs the storing jobs stored in the external memory 21 according to the job list.

Figure 10:
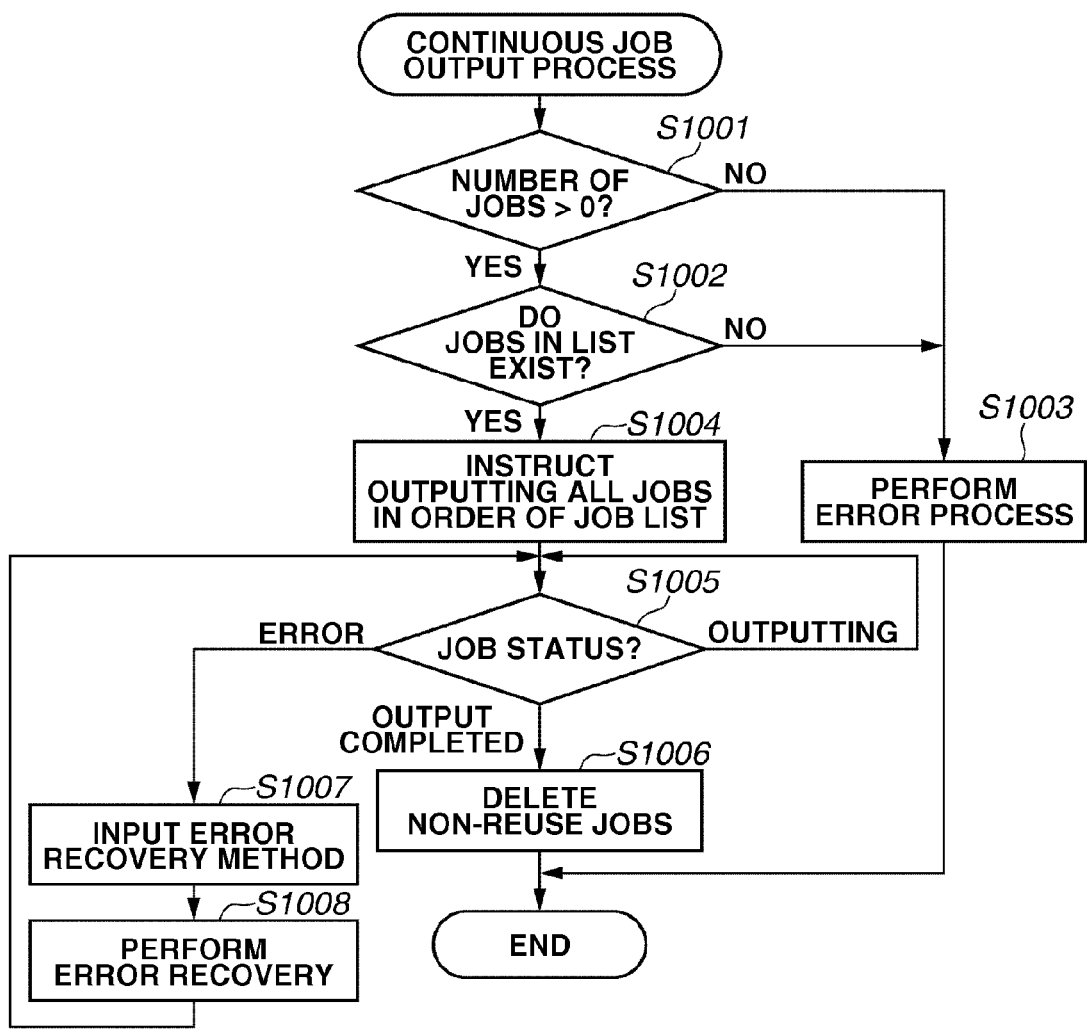
FIG. 10 is a flowchart illustrating a continuous job output process.

FIG. 10 is a flowchart illustrating in detail the continuous job output process performed by the continuous output application 301. The process illustrated in FIG. 10 is performed by the CPU 12 of the printer 150 controlling each component in the host computer 100 according to the program stored in the ROM 104.

In step S1001, the CPU 12 determines whether the number of jobs included in the job list received from the host computer 100 is one or more. If the number of jobs included in the job list is one or more (YES in step S1001), the process proceeds to step S1002. On the other hand, if the number of jobs included in the job list received from the host computer 100 is less than one (NO in step S1001), the process proceeds to step S1003.

In step S1002, the CPU 12 determines whether all of the storing jobs corresponding to the jobs included in the job list are stored in the external memory 21. If all of the storing jobs corresponding to the jobs included in the job list are stored in the external memory 21 (YES in step S1002), the process proceeds to step S1004. If all of the storing jobs corresponding to the jobs included in the job list are not stored in the external memory 21 (NO in step S1002), the process proceeds to step S1003. In step S1003, the CPU 12 performs error processing, and the process ends.

In step S1004, the CPU 12 instructs the BOX 302 illustrated in FIG. 3 to output the storing jobs in the order of the job list. Upon receiving the output instruction, the BOX 302 inputs the jobs to the printing unit 19 in the order of the output instruction. In such a case, other jobs are prohibited from interrupting until all of the input jobs are output. After the jobs are input, the printing unit 19 generates and prints output images by performing raster image processing (RIP).

In step S1005, the CPU 12 monitors a job status of the printing unit 19 at constant time intervals. When the printing unit 19 finishes printing all of the storing jobs corresponding to the job list, and the job status becomes "output completed" (OUTPUT COMPLETE in step S1005), the process proceeds to step S1006. Further, if an error occurs during execution of the job, and the job status thus becomes "error" (ERROR in step S1005), the process proceeds to step S1007. Furthermore, if the job status is "outputting" (OUTPUTTING in step S1005), the CPU 12 continues to monitor the job status in step S1005.

In step S1006, the CPU 12 deletes from the external memory 21 the storing jobs corresponding to the jobs in the job list whose reuse flag are "OFF", and the process ends. According to the processing in step S1006, the CPU 12 can save the storing jobs whose reuse flags are "ON" in the external memory 21, so that it becomes unnecessary to transmit a page whose content is fixed from the host computer 100 every time. Further, the memory capacity of the external memory 21 of the printer 150 can be efficiently used by deleting unnecessary storing jobs according to selection by the user.

In step S1007, the CPU 12 displays to the user an error recovery method and waits for an input from the user. The CPU 12 may display the error recovery method on the operation unit 20 of the printer 150 or the display 10 of the host computer 100. In step S1008, the CPU 12 performs an error recovery process according to the error recovery method input by the user in step S1007.

Figure 11:
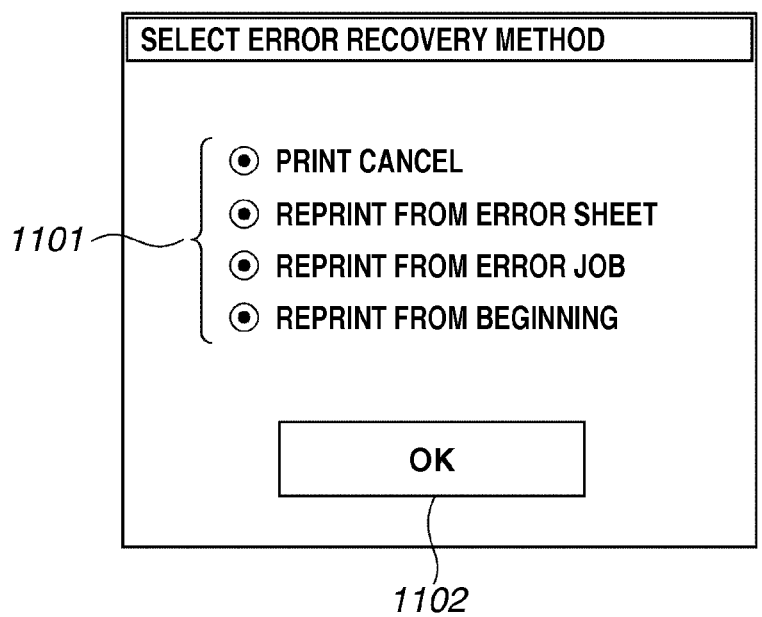
FIG. 11 illustrates an example of a screen for selecting an error recovery method.

FIG. 11 illustrates an example of a screen for the user to select the error recovery method. Referring to FIG. 11, the user presses one of radio buttons 1101 and presses an OK button 1102 to input the error recovery method. For example, if the user presses "print cancel", the CPU 12 instructs the printing unit 19 to cancel printing to and records on an error log. The CPU 12 then causes the job status to be "output completed", and the process returns to step S1005. If the user selects "reprint from error sheet", the CPU 12 instructs to the printing unit 19 to perform a general error recovery process, and the process returns to step S1005. If the user selects "reprint from error job", the CPU 12 again inputs the same job to the printing unit 19 after the error job and instructs deletion of the error job. The process then returns to step S1005. If the user selects "reprint from beginning", the CPU 12 inputs after the error job, the jobs from the first job to the job previous to the error job to the printing unit 19 and instructs deletion of the error job. The process then returns to step S1005.

According to the above described processes of the present exemplary embodiment, the jobs that are previously stored in the external memory are output in the order of the job list. As a result, the jobs are not interrupted by other jobs, and the printing order of the plurality of jobs is assured.

Further, according to the above described exemplary embodiment, the job of the page whose content is fixed is reused. Thus, not only a load on the user, but also a data amount in job transmission from the host computer, a processing load of the printer, and a necessary capacity of the external memory can be reduced. Furthermore, since data transmission from the host is completed before the user instructs print start, output time from an output start instruction can be shortened.

Figure 12:
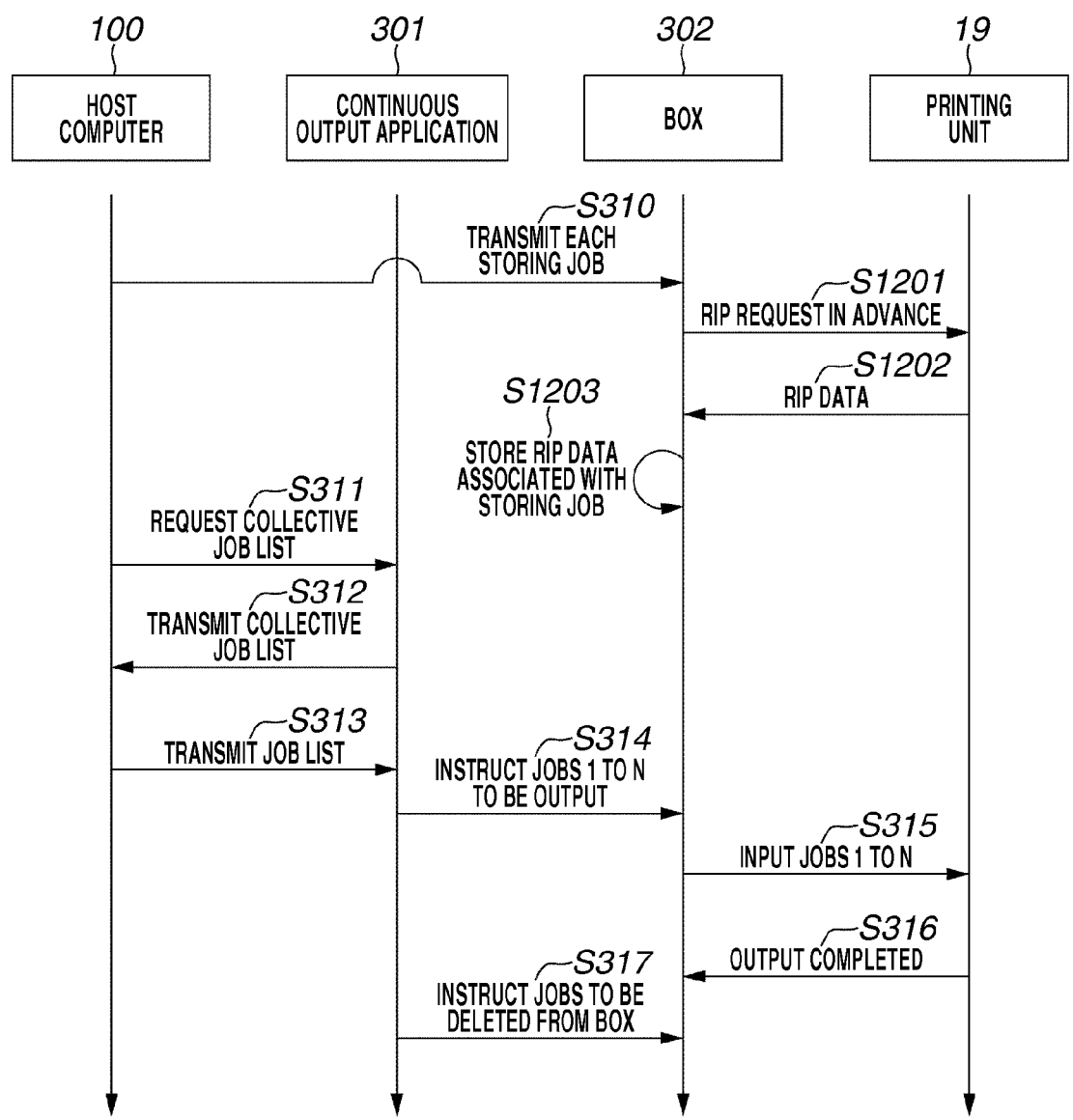
FIG. 12 is an entire sequence diagram illustrating a process for assuring a multiple job printing order according to another exemplary embodiment of the present invention.

According to the first exemplary embodiment, the RIP processing of the job stored in the external memory is performed when actually printing the job (S315 illustrated in FIG. 3). However, the RIP processing may be performed when the job is stored in the external memory 21 (S310). A process performed in such a case will be described below with reference to a sequence diagram illustrated in FIG. 12. Since the printing system applied to the present exemplary embodiment is similar to that described in the first exemplary embodiment, description thereof will be omitted. Further, referring to FIG. 12, description on portions which are similar to the process described with reference to FIG. 3 in the first exemplary embodiment will be omitted by assigning the same reference numbers. The difference from the first exemplary embodiment will be mainly described below.

In step S1201, the CPU 12 recognizes an advanced RIP instruction included in the storing job received from the host computer 100. The CPU 12 then instructs the printing unit 19 to perform the RIP processing on the storing job. In step S1202, the CPU 12 stores, in the external memory 21, RIP data corresponding to the storing job on which the printing unit 19 has performed the RIP processing associated with the storing job.

As described above, by performing the RIP processing before the user instructs printing, it becomes unnecessary to perform the RIP processing in step S315, and the time required for printing can be shortened. According to the present exemplary embodiment, it is desirable for the advanced RIP instruction to be performed according to the user operation on the print setting screen illustrated in FIG. 4.

The object of the present invention can also be achieved by providing software (program codes) for realizing the functions of the above described exemplary embodiments to a system or an apparatus, and a computer (i.e., a CPU or a micro-processing unit (MPU)) of the system or the apparatus reading and executing the software (the program codes). In this case, the software (the program codes) and the storage medium storing the software (program codes) constitute the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-278013 filed Dec. 7, 2009, which is hereby incorporated by reference herein in its entirety.

What is claimed is:

1. A printing system comprising:
an information processing apparatus comprising:
a job transmission unit configured to transmit a job to be printed to a printing apparatus;
a job list request unit configured to request from the printing apparatus a stored job list that is stored in the printing apparatus;
a determination unit configured to determine a plurality of jobs to be collectively printed and a printing order of the plurality of jobs from the stored job list received from the printing apparatus;
a job list creation unit configured to create a job list based on the plurality of jobs to be collectively printed and the printing order of the plurality of jobs determined by the determination unit; and
a first job list transmission unit configured to transmit the job list created by the job list creation unit to the printing apparatus; and the printing apparatus storing the job received from the information processing apparatus in the stored job list, the printing apparatus comprising:
a second job list transmission unit configured to acquire the stored job list and transmit the stored job list to the information processing apparatus according to a request from the job list request unit;
a controlling unit configured to control rasterizing of an image of each job upon receipt of each job to be printed from the job transmission unit and configured to control printing of the plurality of jobs listed in the job list in the printing order according to the job list received from the information processing apparatus, wherein the printing unit prints rasterized images of the plurality of jobs only after receiving the job list from the information processing apparatus; and
an expansion program execution platform embedded in the printing apparatus, on which an expansion program is executed,
wherein the second job list transmission unit and the controlling unit are provided in accordance with the expansion program executed on the expansion program execution platform.

2. The printing system according to claim 1, wherein the information processing apparatus further comprises a display unit configured to display the stored job list received from the printing apparatus, and
wherein the determination unit determines the plurality of jobs to be collectively printed and the printing order of the plurality of jobs according to an operation of a user via the stored job list displayed on the display unit.

3. The printing system according to claim 1, wherein the information processing apparatus further comprises a collective printing designation unit configured to designate a job to be transmitted to the printing apparatus as a job to be collectively printed, and
wherein the second job list transmission unit acquires a stored job list of jobs which are designated as the jobs to be collectively printed by the collective printing designation unit among the stored jobs, and transmits the stored job list to the information processing apparatus.

4. The printing system according to claim 1, wherein the information processing apparatus further comprises a reuse designation unit configured to designate a job to be reused after the job is printed,
wherein the printing apparatus further comprises a deletion unit configured to delete, after the printing unit completes printing of the plurality of jobs listed in the stored job list, a job which is not designated to be reused by the reuse designation unit among the plurality of jobs listed in the stored job list, and
wherein the job list creation unit creates a job list based on a designation by the reuse designation unit in addition to the plurality of jobs to be collectively printed and the printing order of the plurality of jobs.

5. A method for controlling a printing system including an information processing apparatus and a printing apparatus, the method comprising:
transmitting a job to be printed to the printing apparatus;
storing the job received from the information processing apparatus in a stored job list;
rasterizing an image of each job upon receipt of each job to be printed;
requesting from the printing apparatus the stored job list that is stored in the printing apparatus;
acquiring the stored job list;

transmitting the stored job list to the information processing apparatus in response to the request;
determining a plurality of jobs to be collectively printed and a printing order of the plurality of jobs from the stored job list received from the printing apparatus;
creating a job list based on the determined plurality of jobs to be collectively printed and the determined printing order of the plurality of jobs;
transmitting the created job list to the printing apparatus; and
printing the plurality of jobs listed in the job list in the printing order according to the job list transmitted to the printing apparatus,
wherein rasterized images of the plurality of jobs are printed only after the job list is received by the printing apparatus,
wherein an expansion program is executed on an expansion program execution platform embedded in the printing apparatus, and
wherein the steps of acquiring and transmitting the stored job list, rasterizing the image, and printing the plurality of jobs are provided in accordance with the expansion program executed on the expansion program execution platform.

6. The method according to claim 5, further comprising:
displaying the stored job list; and
determining the plurality of jobs to be collectively printed and the printing order of the plurality of jobs according to an operation of a user via the displayed stored job list.

7. The method according to claim 5, further comprising:
designating a job as a job to be collectively printed;
acquiring a stored job list of the jobs which are designated as the jobs to be collectively printed among the jobs; and
transmitting the stored job list to the information processing apparatus.

8. The method according to claim 5, further comprising:
designating a job to be reused after the job is printed;
deleting, after the plurality of jobs are printed according to the job list, a job which is not designated to be reused from the plurality of jobs corresponding to the job list; and
creating a job list based on the reuse designation in addition to the plurality of jobs to be collectively printed and the printing order of the plurality of jobs.

9. A non-transitory computer-readable storage medium storing a program capable of causing a computer to execute each step of a method for controlling a printing system including an information processing apparatus and a printing apparatus, the method comprising:
transmitting a job to be printed to the printing apparatus;
storing the job received from the information processing apparatus in a stored job list;
rasterizing an image of each job upon receipt of each job to be printed;
requesting from the printing apparatus the stored job list that is stored in the printing apparatus;
acquiring the stored job list;
transmitting the stored job list to the information processing apparatus in response to the request;
determining a plurality of jobs to be collectively printed and a printing order of the plurality of jobs from the stored job list received from the printing apparatus;
creating a job list based on the determined plurality of jobs to be collectively printed and the determined printing order of the plurality of jobs;
transmitting the created job list to the printing apparatus; and
printing the plurality of jobs listed in the job list in the printing order according to the job list transmitted to the printing apparatus,
wherein rasterized images of the plurality of jobs are printed only after the job list is received by the printing apparatus,
wherein an extended program is executed on an extended program execution platform embedded in the printing apparatus, and
wherein the steps of acquiring and transmitting the stored job list, rasterizing the image, and printing the plurality of jobs are provided in accordance with the expansion program executed on the expansion program execution platform.

* * * * *